Patented Mar. 19, 1940

2,193,858

UNITED STATES PATENT OFFICE 2,193,858

HALOGENATED ORGANIC COMPOUNDS

Edwin R. Buchman, Baltimore, Md.

No Drawing. Original application September 1, 1936, Serial No. 98,929. Divided and this application December 31, 1936, Serial No. 118,573

10 Claims. (Cl. 260—344)

This invention relates to halogen derivatives of aceto butyrolactone and methods of making such derivatives. Halogen derivatives of aceto butyrolactone may be converted by a suitable hydrolyzing step to the corresponding halogen derivatives of aceto propyl alcohol.

This application is a division of my copending application, Serial No. 98,929, filed September 1, 1936, for Halogenated organic compounds which is a continuation in part of application Serial No. 11,683, filed March 18, 1935.

Halogen derivatives of aceto propane are useful in the synthesis of the antineuritic vitamin, also known as "Vitamin B and B₁", and other physiologically active substances. This vitamin has very desirable therapeutic and nutritional properties which render it valuable for use as a therapeutic agent and as a constituent of therapeutic products and foods.

An object of the invention is to provide new and useful methods of making halogenated organic compounds and intermediates for producing the same.

A further object of the invention is to provide new and useful halogen derivatives of aceto propane and intermediates which are effective for the production thereof.

In accordance with the invention a halogen derivative of (α aceto) γ butyrolactone may be prepared by direct halogenation of the lactone. The resulting product may be hydrolyzed to produce a halogen derivative of aceto propyl alcohol.

The above described and other objects and features of the invention will be evident from the following description of specific embodiments of the invention.

One embodiment of the invention comprises the steps of preparing (α chlor α aceto) γ butyrolactone by treating (α aceto) γ butyrolactone with sulphuryl chloride. The resulting halogenated lactone may be hydrolyzed to produce γ chlor γ aceto propyl alcohol. The (α aceto) γ butyrolactone employed in this reaction has the formula

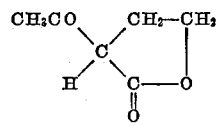

and may be prepared in accordance with the method described in the article by I. L. Knunyants, G. V. Chelintzev and E. D. Osetrova, published in Compt. Rend. Acad. Sci. U. S. S. R. n. s. 1, 315-17 (1934) and referred to in Chemical Abstracts 28, 4382 (1934). This reaction is carried out by causing ethyl aceto acetate to react with ethylene oxide in the presence of either sodium ethylate or sodium methylate, the latter being preferred.

In carrying out this reaction 68 grams of the (α aceto) γ butyrolactone are placed in a flask equipped with a mechanical stirrer and 68 grams of sulphuryl chloride are added with continual stirring over a period of one and a half hours. After the reaction is completed the reaction product is washed with water, taken up in ether and dried over a suitable dehydrating agent, such as calcium chloride. The ethereal extract is then distilled at a reduced pressure and the fraction distilling at approximately 85° C. and 2 or 3 mm. pressure is collected. This product is substantially pure (α chlor α aceto) γ butyrolactone having the formula:

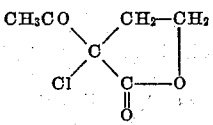

This product may be hydrolyzed to convert it into γ chlor γ aceto propyl alcohol as follows:

81 grams of this chlor lactone, 80 cc. of water and 15 cc. concentrated hydrochloric acid are then mixed and heated under a reflux condenser at 100° C. for 75 minutes. The reaction mixture is then extracted several times with small portions of ether and the combined ethereal solution is dried over a dehydrating material, such as sodium sulphate. The dried solution contains a substantial quantity of γ chlor γ aceto propyl alcohol which may be further purified if desired.

The bromine compound which corresponds to the chlorinated lactone described hereinabove may be made in an analogous manner by treating (α aceto) γ butyrolactone in aqueous suspension with bromine. The bromine compound corresponding to the above described chlorinated aceto propyl alcohol may then be prepared by hydrolyzing the brominated lactone with dilute hydrobromic acid.

These reactions may be carried out by suspending 32 grams of (α aceto) γ butyrolactone in 70 cc. of water and adding 40 grams of bromine thereto drop by drop, meanwhile vigorously stirring the mixture with a mechanical stirrer. This will produce (α brom α aceto) γ butyrolactone and in the reaction which occurs hydrobromic acid is also produced. This brominated lactone may be hydrolyzed to γ brom γ aceto propyl alcohol by means of a dilute solution of hydrobromic acid. Since hydrobromic acid is present in the reaction mixture resulting from the bromination of the lactone, the simplest way to hydrolyze the brominated lactone is to continue to stir the mixture after the bromine has been added, until the hydrolysis is completed. The brom aceto propyl alcohol resulting from the hydrolysis is extracted from the mixture with ether, and the ethereal extract is dried. The dried extract may then be further purified if desired.

Both the chlorine and the bromine derivatives of γ aceto propyl alcohol produced by hydrolyzing the halogenated lactones made in accordance with the invention may be condensed with thio formamide to produce salts of the thiazole derivative known as 4 methyl 5 (β hydroxyl ethyl) thiazole in accordance with the method outlined in Patent No. 2,133,966 granted October 25, 1938 upon my copending application, Serial No. 11,682, filed March 12, 1935. This thiazole derivative may in turn be caused to enter into other reactions to produce synthetic compounds having the physiological and therapeutic properties of the antineuritic vitamin.

What is claimed is:

1. The method of making halogenated organic compounds, which comprises treating (α aceto) γ butyrolactone with a halogenating agent from the group consisting of sulphuryl chloride and bromine to produce the halogenated lactone having the formula:

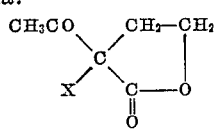

in which X is a halogen from the group consisting of chlorine and bromine.

2. The method of making a halogenated organic compound, which comprises treating (α aceto) γ butyrolactone with sulphuryl chloride to produce:

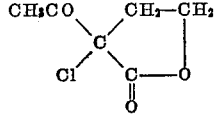

3. The method of making a halogenated organic compound, which comprises treating (α aceto) γ butyrolactone with bromine to produce:

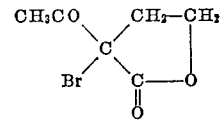

4. The lactone having the formula:

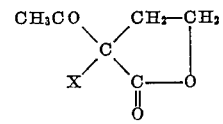

in which X is a halogen from the group consisting of chlorine and bromine.

5. The compound (α chlor α aceto) γ butyrolactone.

6. The compound (α brom α aceto) γ butyrolactone.

7. The compounds produced by halogenating (α aceto) γ butyrolactone with an agent from the group consisting of sulphuryl chloride and bromine.

8. The compound produced by halogenating (α aceto) γ butyrolactone with sulphuryl chloride.

9. The compound produced by halogenating (α aceto) γ butyrolactone with bromine.

10. The method of making a halogenated lactone, which comprises treating (α aceto) γ butyrolactone with a halogenating agent from the group consisting of sulfuryl halides and halogens which produce a halogenated lactone having the formula

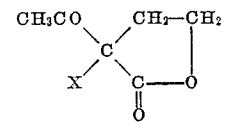

in which X is a halogen from the group consisting of chlorine and bromine.

EDWIN R. BUCHMAN.